United States Patent
Fukui et al.

(10) Patent No.: US 10,897,717 B2
(45) Date of Patent: Jan. 19, 2021

(54) BEAM TRANSMISSION-RECEPTION METHOD, BASE STATION, TERMINAL, AND WIRELESS COMMUNICATION SYSTEM

(71) Applicant: MITSUBISHI ELECTRIC CORPORATION, Tokyo (JP)

(72) Inventors: Noriyuki Fukui, Tokyo (JP); Kazuaki Ishioka, Tokyo (JP); Keijiro Take, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/061,795

(22) PCT Filed: Feb. 29, 2016

(86) PCT No.: PCT/JP2016/056054
§ 371 (c)(1),
(2) Date: Jun. 13, 2018

(87) PCT Pub. No.: WO2017/149601
PCT Pub. Date: Sep. 8, 2017

(65) Prior Publication Data
US 2018/0368005 A1    Dec. 20, 2018

(51) Int. Cl.
*H04W 16/28* (2009.01)
*H04W 74/08* (2009.01)

(52) U.S. Cl.
CPC ......... *H04W 16/28* (2013.01); *H04W 74/08* (2013.01); *H04W 74/0833* (2013.01)

(58) Field of Classification Search
CPC .. H04W 16/28; H04W 74/0833; H04W 74/08
See application file for complete search history.

(56) References Cited

U.S. PATENT DOCUMENTS

| | | | |
|---|---|---|---|
| 9,537,548 B2* | 1/2017 | Thomas | H04B 7/043 |
| 9,900,797 B2* | 2/2018 | Jung | H04B 7/0617 |

(Continued)

FOREIGN PATENT DOCUMENTS

| | | |
|---|---|---|
| EP | 2 076 087 A2 | 1/2009 |
| JP | 2001-203623 A | 7/2001 |

(Continued)

OTHER PUBLICATIONS

Extended European Search Report dated Jan. 25, 2019 received in counterpart European Application No. EP 16 89 2446.

(Continued)

*Primary Examiner* — Christopher P Grey
(74) *Attorney, Agent, or Firm* — Birch, Stewart, Kolasch & Birch, LLP

(57) ABSTRACT

Provided is a beam transmission/reception method, which is executed in a wireless communication system in which a terminal and a base station use a beam to communicate to and from each other. The method includes a step of grouping, by the base station, when the base station is to receive a random access channel signal transmitted as a connection request from the terminal, a plurality of beam directions by combining a main beam direction, which is determined as suitable for reception of the random access channel signal, with one or more beam directions adjacent to the main beam direction, and of receiving the random access channel signal with use of the grouped plurality of beam directions.

11 Claims, 8 Drawing Sheets

(56) References Cited

U.S. PATENT DOCUMENTS

| | | | | |
|---|---|---|---|---|
| 9,948,375 | B2* | 4/2018 | Yu | H04W 16/28 |
| 9,979,457 | B2* | 5/2018 | Jo | H04B 7/0634 |
| 2014/0211731 | A1* | 7/2014 | Inoue | H04B 7/0456 |
| | | | | 370/329 |
| 2016/0192341 | A1* | 6/2016 | Park | H04B 7/0408 |
| | | | | 455/501 |
| 2017/0111850 | A1* | 4/2017 | Okasaka | H04W 16/28 |
| 2017/0205422 | A1* | 7/2017 | Moritz | G01N 33/6848 |
| 2018/0027594 | A1* | 1/2018 | Nagaraja | H04B 7/0695 |
| | | | | 370/329 |
| 2019/0223058 | A1* | 7/2019 | Fukui | H04B 17/21 |

FOREIGN PATENT DOCUMENTS

| | | |
|---|---|---|
| JP | 2004-72539 A | 3/2004 |
| JP | 2010-171653 A | 8/2010 |
| JP | 2014-530535 A | 11/2014 |
| JP | 2015-185914 A | 10/2015 |
| WO | WO 2014/021008 A1 | 2/2014 |
| WO | WO 2015/140838 A1 | 9/2015 |
| WO | WO 2015/194338 A1 | 12/2015 |

OTHER PUBLICATIONS

Office Action dated Dec. 11, 2018 in counterpart application No. JP 2017-551342 with an English Translation.

* cited by examiner

GROUP 1

GROUP 2

GROUP 1

GROUP 2

GROUP 1

GROUP 2

GROUP 3

GROUP 4

BEAM TRANSMISSION-RECEPTION METHOD, BASE STATION, TERMINAL, AND WIRELESS COMMUNICATION SYSTEM

TECHNICAL FIELD

The present invention relates to a beam transmission/reception method in which communication is held between one or more base stations forming a communication service area and one or more terminals present in each communication service area, a base station, a terminal, and a wireless communication system.

BACKGROUND ART

There is a technology with which, in communication between a base station and a terminal, the base station sends a signal by forming a beam (beam forming) only in the direction of the communication destination terminal with the use of a plurality of antennas. This technology enables the base station to limit the direction in which a wireless signal travels. Interference with another terminal located in another place can consequently be prevented or reduced.

In addition, the transmission of a signal in a particular direction makes transmission power concentrated compared to when a signal is transmitted to the entire service area, and the concentration can be utilized to extend the distance covered by the signal.

This beam forming is applicable also when a base station receives a signal from a terminal. Specifically, by giving signal reception directivity to a reception antenna of a base station, the influence of interference waves arriving from other directions than the direction of the reception directivity can be prevented or reduced.

However, a single beam allows a signal to travel only in a particular direction or allows a base station to receive a signal only from a particular direction as described above, and a single base station therefore requires a plurality of beam directions in order to cover the entire service area of the base station. FIG. 13 is an explanatory diagram about a base station whose service area is established with the use of a plurality of beam directions.

In initial connection to start communication, a terminal first searches for a base station with which a signal quality high enough to hold communication is obtained. The terminal also conducts a search for nearby base stations, excluding a base station with which the terminal is currently holding communication, when what is called handover takes place in which the terminal switches from the current communication partner base station to another base station.

FIG. 14 is an explanatory diagram for illustrating a signal sequence of general handover in a wireless communication system in which beam forming is not used. A terminal detects quality deterioration in a signal communicated to and from a base station (communication base station) with which the terminal is currently holding communication. The terminal then receives and measures broadcast signals transmitted from nearby base stations, and sends a report on the result of the measurement to the current communication partner base station, along with a handover request.

When receiving the report, the current communication partner base station determines a nearby base station from which reception has the best quality, or selects one of nearby base stations with which a signal quality high enough to hold communication is obtained, and requests the determined nearby base station to accept handover. The requested nearby base station sends a response informing of its acceptance to the current communication partner base station when the requested nearby base station is available for handover.

The current communication partner base station receives the response informing of the availability for handover, and transmits a handover execution command to the terminal along with information (a base station ID and the like) about the nearby base station that is the handover destination.

The terminal receives the handover execution command and transmits a random access channel (RACH) signal as a communication request to the handover destination nearby base station. The nearby base station detects the RACH signal, and returns an access channel response signal to the terminal to start communication.

Information about timing at which a base station can receive a RACH signal is normally contained in the base station's broadcast signal. The terminal can accordingly find out the RACH signal reception timing of the base station from the broadcast signal, and times the transmission of a RACH signal with the reception timing.

One of or all of the following information and signals are referred to herein as "broadcast signal".

A synchronization signal required for a terminal to synchronize with a base station in frequency and time, and containing the identifier of the base station (a base station ID)

A reference signal for measuring the quality of a signal from a base station (also called a pilot signal)

Minimum information required for a terminal to establish communication to a base station, for example, information about a frequency used by the base station to receive a RACH signal and RACH signal reception timing of the base station A method of establishing initial connection in a system using the beam forming technology is disclosed in the related art (see Patent Literature 1, for example). In Patent Literature 1, one base station changes the beam direction sequentially, and transmits a signal (a search signal) for searching for terminals. The search signal contains, among others, information about timing at which the base station receives a RACH signal.

Each time the timing is changed, the base station changes a beam direction in which the search signal is transmitted, and a beam direction in which a RACH signal is received as well. Accordingly, the timing has an association relation with the directions of a search signal transmission beam and a RACH signal reception beam, and the search signal contains information about the timing of receiving a corresponding RACH signal.

It is also disclosed in Patent Literature 1 that, when a base station can form a plurality of beams simultaneously, RACH signals are received at the same reception timing by forming beams in a plurality of directions. With regard to the combination of a plurality of beams, it is only mentioned in Patent Literature 1 that a combination with high orthogonality is selected. It is also described in Patent Literature 1 that the same concept is applied to handover.

CITATION LIST

Patent Literature

[PTL 1] JP 2015-185914 A

SUMMARY OF INVENTION

Technical Problem

The related art, however, has the following problems:
There is a lapse of time since a terminal receives and measures a broadcast signal of a nearby base station till the terminal transmits a RACH signal, and the terminal may have moved during the lapse of time. Accordingly, with the method described in Patent Literature 1 alone, the optimum beam direction from a base station toward a terminal may change during a period from when the terminal measures a signal from the nearby base station till when the terminal transmits a RACH signal.

While it is described in Patent Literature 1 that a plurality of beams are formed at the same timing, the only mention made in Patent Literature 1 with regard to the combination of beam directions is that beams orthogonal to each other are combined.

As described above, a terminal identifies an optimum beam direction from a result at the time when a broadcast signal from a nearby base station is received and measured, and the nearby base station is informed of the optimum beam direction. If the terminal has already moved out of an area covered by a beam for RACH signal reception, however, the move causes a problem in that the nearby base station fails to properly receive a RACH signal transmitted from the terminal at the time when the nearby base station directs the beam for RACH signal reception to the optimum beam direction.

The problem of a failure to receive a RACH signal can occur even when the terminal has not moved, due to a change in the environment of the base station or of the terminal and the resultant switch of wireless transmission paths. The same problem occurs also when a base station currently holding communication to and from a terminal to be handed over and receiving a report on a measurement result from the terminal determines a handover destination base station and a handover destination beam direction by applying the example of FIG. 14 in addition to Patent Literature 1.

The present invention has been made to solve the problems described above, and an object of the present invention is therefore to provide a beam transmission/reception method, a base station, a terminal, and a wireless communication system with which handover can be executed more securely than in the related art by preventing a state leading to a failure to receive a RACH signal from a moving terminal in handover.

Solution to Problem

A beam transmission/reception method according to one embodiment of the present invention is a beam transmission/reception method, which is executed in a wireless communication system in which a terminal and a base station use a beam to communicate to and from each other, the beam transmission/reception method includes a first step of grouping, by the base station, when the base station is to receive a random access channel signal transmitted as a connection request from the terminal, a plurality of beam directions by combining a main beam direction, which is determined as suitable for reception of the random access channel signal, with one or more beam directions adjacent to the main beam direction, and of receiving the random access channel signal with use of the grouped plurality of beam directions.

A base station according to one embodiment of the present invention is a base station, which is to be applied to a wireless communication system in which a beam is used for communication to and from a terminal, the base station including: a controller configured to control, when a random access channel signal transmitted as a connection request from the terminal is to be received, a beam direction of an antenna unit by combining a main beam direction, which is determined as suitable for reception of the random access channel signal, with one or more beam directions adjacent to the main beam direction, and thus grouping a plurality of beam directions; a transmitter/receiver configured to receive, via the antenna unit, the random access channel signal transmitted from the terminal; and a detector configured to detect whether the random access channel signal has been received by the transmitter/receiver.

A terminal according to one embodiment of the present invention is a terminal, which is to be applied to a wireless communication system in which a beam is used for communication to and from a base station, the terminal including, when the base station includes a current communication partner base station, which is holding communication to and from the terminal, and a nearby base station, which is a handover destination: a transmitter/receiver configured to receive, from the nearby base station, a broadcast signal containing information about timing at which reception of a random access channel signal is possible in a grouped plurality of beam directions; a quality measurement device configured to measure, when the transmitter/receiver receives as the broadcast signal a plurality of broadcast signals associated with different groups, for each of the plurality of broadcast signals, a communication quality of the each of the plurality of broadcast signals from a reception state of the each of the plurality of broadcast signals, and configured to identify, for each of the plurality of broadcast signals, timing at which reception of a random access channel signal corresponding to the each of the plurality of broadcast signals is possible; and a controller configured to control, when two or more broadcast signals determined as having a suitable communication quality are included among the plurality of broadcast signals, transmission of a random access channel signal for each of the two or more broadcast signals so that the random access channel signal is transmitted at timing indicated by the each of two or more broadcast signals.

A wireless communication system according to one embodiment of the present invention is a wireless communication system including a base station and a terminal, in which, when the base station includes a current communication partner base station, which is holding communication to and from the terminal, and a nearby base station, which is a handover destination: a controller of the nearby base station groups a plurality of beam directions, generates, for each group of the plurality of beam directions, a broadcast signal containing first information and second information, and transmits the broadcast signal via a transmitter/receiver of the nearby base station, the first information being about shared timing at which reception of a random access channel signal is possible, the second information defining a number of beam direction groups, and in which, when the broadcast signal is received from the nearby base station, a controller of the terminal identifies timing at which reception of a random access channel signal is possible from the first information contained in the broadcast signal, identifies, as a transmission count of the random access signal, a count matching the number of beam direction groups in the second information, the transmission count being a number of times the random access channel signal is transmitted, and transmits the random access channel signal as many times as the identified transmission count at the identified timing.

Advantageous Effects of Invention

According to the present invention, a configuration is included in which adjacent beam directions are combined into a group as a combination of a plurality of beam directions when a RACH signal is to be received at a base station. The beam transmission/reception method, the base station, the terminal, and the wireless communication system with which handover can be executed more securely than in the related art by preventing a state leading to a failure to receive a RACH signal from a moving terminal in handover are obtained as a result.

DESCRIPTION OF EMBODIMENTS

A beam transmission/reception method, a base station, a terminal, and a wireless communication system according to a preferred embodiment of the present invention are described below with reference to the drawings.

First Embodiment

A method of combining a plurality of beam directions in the present invention is described first with reference to the drawings. FIG. 1 are diagrams for illustrating an example in which the whole service area handled by one base station is divided into two groups in a first embodiment of the present invention.

Figure 1A:
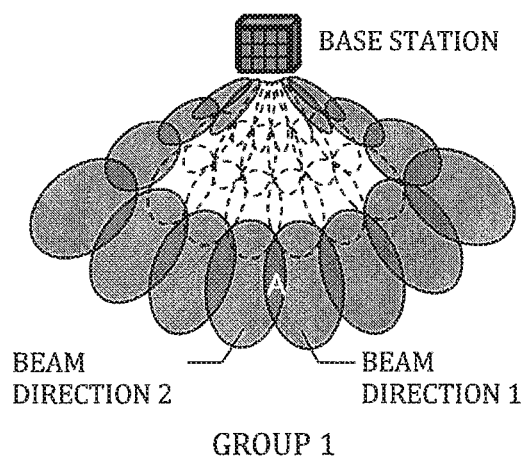
FIG. 1 are diagrams for illustrating an example in which the whole service area handled by one base station is divided into two groups in a first embodiment of the present invention.
Figure 1B:
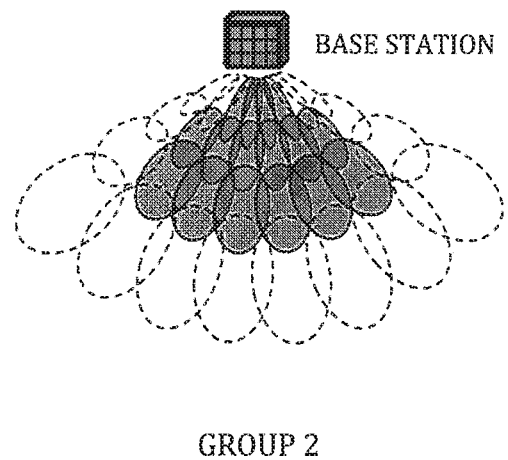

More specifically, the service area of a base station in FIG. 1 is divided into two groups illustrated in FIG. 1A and FIG. 1B when thirty-two beam directions are required to cover the service area and the number of beam directions combined at a time is sixteen. Colored ellipses enclosed by the solid lines represent a group of beam directions combined at the same timing to receive a RACH signal.

As illustrated in FIG. 1, adjacent beam directions are sorted into the same group. Beams in edge directions of the service area are combined into Group 1 of FIG. 1A, and beams in directions other than the edge directions are combined into Group 2 of FIG. 1B.

Figure 2A:
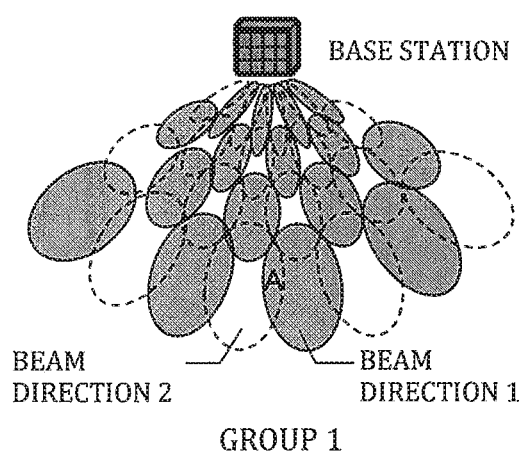
FIG. 2 are diagrams for illustrating an example in which the whole service area handled by one base station is divided into two groups in the related art.
Figure 2B:
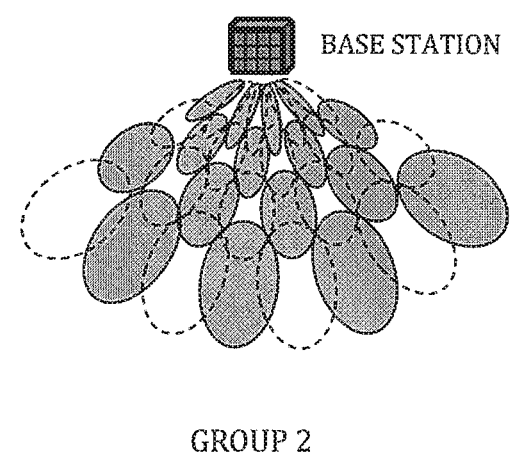

Meanwhile, FIG. 2 are diagrams for illustrating an example in which the whole service area handled by one base station is divided into two groups in the related art. Specifically, in FIG. 2, the service area is divided into two groups illustrated in FIG. 2A and FIG. 2B by sorting non-adjacent beam directions into the same group, as an example of grouping different from the grouping in the first embodiment illustrated in FIG. 1.

Figure 3:
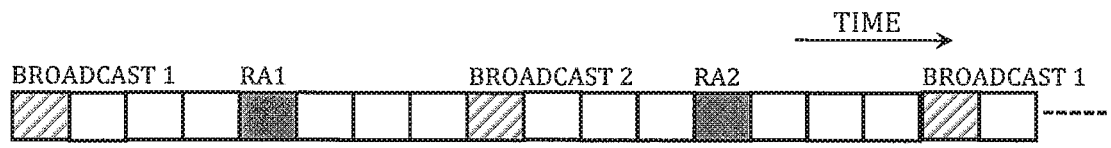
FIG. 3 is a diagram for illustrating an example of a relation between the timing of broadcast signal transmission by a base station and the timing of RACH signal reception at the base station in a wireless communication system according to the first embodiment of the present invention.

FIG. 3 is a diagram for illustrating an example of a relation between the timing of broadcast signal transmission by a base station and the timing of RACH signal reception at the base station in the wireless communication system according to the first embodiment of the present invention. "Broadcast 1", "Broadcast 2", "RA 1", and "RA 2" in FIG. 3 respectively mean the following:

"Broadcast 1": timing at which a broadcast signal is transmitted in the same group of beam directions as RACH signal reception group 1

"Broadcast 2": timing at which a broadcast signal is transmitted in the same group of beam directions as RACH signal reception group 2

"RA 1": timing at which a RACH signal is received in RACH signal reception group 1

"RA 2": timing at which a RACH signal is received in RACH signal reception group 2

Blank time slots are used for the transmission/reception of other signals. At RACH signal reception timing, the base station directs beams to the beam directions illustrated in one of FIG. 1A and FIG. 1B to execute RACH signal detection operation.

A terminal in search of a base station and a beam direction for initial connection or for handover detects a broadcast signal and, by detecting the same broadcast signal twice or more, can determine the cycle of the broadcast signal. If a broadcast signal transmitted from the same base station but containing different information is detected within the determined cycle, the terminal measures that broadcast signal as well.

When detecting a plurality of different broadcast signals as in this case, the terminal transmits a RACH signal for initial connection at, for example, RACH signal reception timing of the same group to which the beam direction of a broadcast signal highest in quality belongs.

Specifically, when the highest quality is obtained at the timing of "Broadcast 1", the terminal transmits a RACH signal at the timing of "RA 1", and, when the highest quality is obtained at the timing of "Broadcast 2", the terminal transmits a RACH signal at the timing of "RA 2".

In initial connection, the base station has no way of finding out at which timing the terminal transmits a RACH signal. The base station therefore executes RACH signal detection operation equally for two beam directions illustrated in FIG. 1, at two times illustrated as reception timing in FIG. 3.

Meanwhile, in handover, the terminal reports measurement results of all beam directions in which broadcast signals have been detected to a current communication partner base station. The current communication partner base station determines a beam direction used for transmission from the terminal to a handover destination base station, or the timing of RACH signal transmission to the handover destination base station from the terminal and the timing of RACH signal reception at the handover destination base station, and notifies the determined direction or the determined timing to the handover destination base station and the terminal.

The terminal receives the broadcast signal, and, when a beam direction is notified, transmits a RACH signal to the specified handover destination base station at RACH signal reception timing of the same group as a group to which the notified beam direction belongs. When RACH signal transmission/reception timing, not a beam direction, is notified, the terminal transmits a RACH signal at the notified timing.

The handover destination base station receives the notification from the current communication partner base station, and, when the received notification is about a beam direction in which the terminal to be handed over transmits a RACH signal, detects a RACH signal of the terminal at the timing of RACH signal reception in a group that includes the notified beam direction. When the received notification is not about a beam direction but is about RACH signal transmission/reception timing of the terminal to be handed over, the handover destination base station detects a RACH signal of the terminal when the RACH signal is received at the notified timing.

The terminal determines the cycle of a broadcast signal by detecting the same broadcast signal twice or more as already described. The information about the cycle may instead be contained directly in a broadcast signal.

As already described, the current communication partner base station notifies a base station that is to receive a RACH signal of the upcoming transmission of a RACH signal from the terminal at the time when the terminal is handed over. The present invention is not limited thereto, and the operation described above is applicable also to a wireless communication system in which a base station that is to receive a RACH signal can find out the timing of RACH signal transmission from the terminal in advance.

Beam direction 1 is determined as suitable when the terminal located at a point A measures a broadcast signal in the example illustrated in FIG. 2A. If the terminal has already moved to the area of Beam direction 2 illustrated in FIG. 2A at the time of subsequent transmission of a RACH signal, however, the base station cannot receive the RACH signal.

According to the first embodiment, on the other hand, adjacent beam directions are combined into the same group as illustrated in FIG. 1A, thereby enabling the base station to receive a RACH signal despite the moving of the terminal.

The main cause of handover is the moving of the terminal from the service area of another base station. In other words, a terminal to be handed over enters a service area normally from an edge direction of the service area.

It is therefore effective to sort edge directions (i.e., peripheral portions illustrated in FIG. 1A) of a service area into the same group as illustrated in FIG. 1, particularly in handover, in order to receive a signal from a moving terminal without fail.

All beam directions running toward the edges of the service area are combined into the same group in the example of FIG. 1. However, there can be cases in which beam directions running toward the edges of a service area are required to be divided into two or more groups when the number of beam directions running toward the edges is high, or when the number of beams that can be formed at a time is low.

In such cases, too, the basic concept of the invention of this application is the same, and adjacent beam directions out of beam directions running toward the edges of a service area are sorted into the same group as much as possible. FIG. 4 are diagrams for illustrating an example in which the whole service area handled by one base station is divided into four groups in the first embodiment of the present invention.

Figure 4A:
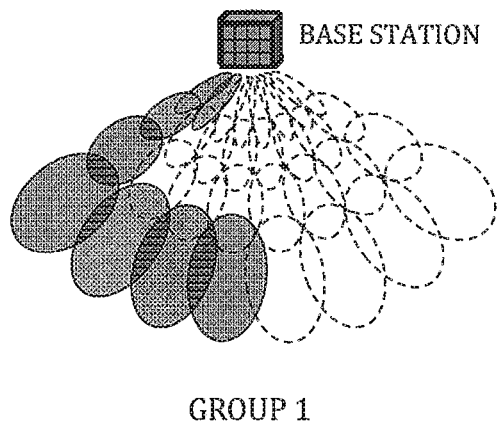
FIG. 4 are diagrams for illustrating an example in which the whole service area handled by one base station is divided into four groups in the first embodiment of the present invention.
Figure 4B:
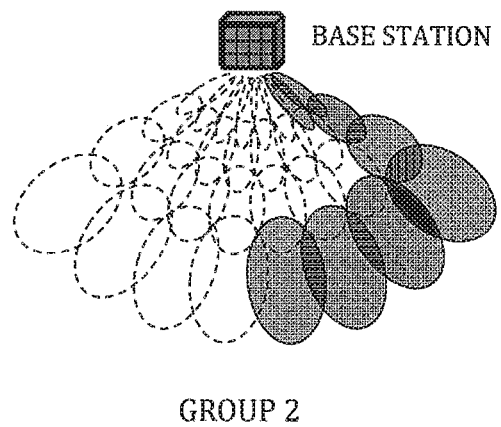
Figure 4C:
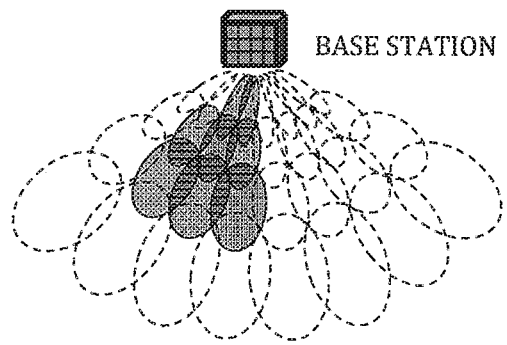
Figure 4D:
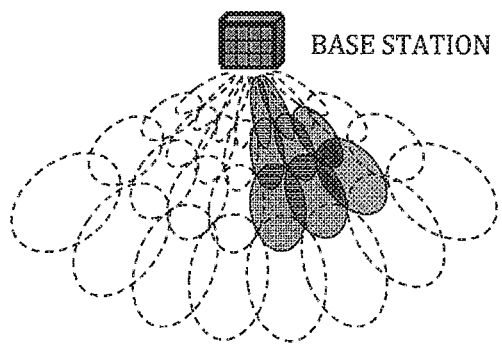

In the specific example illustrated in FIG. 4, the area of FIG. 1A is further divided into two groups, namely, Group 1 of FIG. 4A and Group 2 of FIG. 4B, and the area of FIG. 1B is further divided into two groups, namely, Group 3 of FIG. 4C and Group 4 of FIG. 4D, as an example in which the number of beam directions combined at a time is limited to eight. A four-part division configuration as this, too, can provide the same effects that are obtained with the two-part division configuration of FIG. 1.

Figure 5:
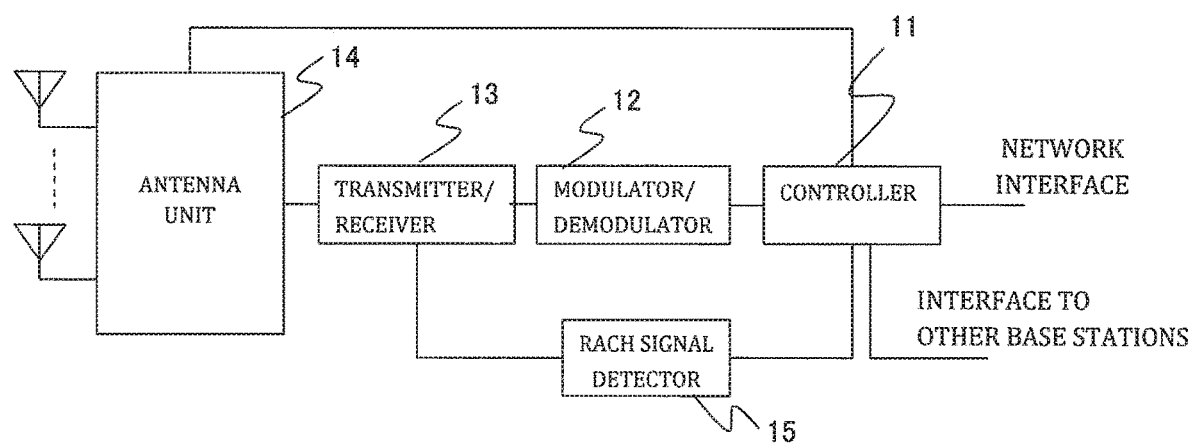
FIG. 5 is a diagram for illustrating the configuration of a base station according to the first embodiment of the present invention.

FIG. 5 is a diagram for illustrating the configuration of a base station according to the first embodiment of the present invention. A controller 11 receives, during communication, data destined to terminals and arriving from a network to which the base station is connected. The controller 11 manages, for each terminal, the timing of transmitting data to the terminal, or wireless resources used for the transmission.

The controller 11 also manages the timing of receiving data from a terminal, or wireless resources used for the reception. The controller 11 further manages the timing of transmitting a broadcast signal, and wireless resources for the transmission.

The controller 11 determines that data is to be transmitted, or a broadcast signal is to be transmitted, to a particular terminal, and notifies information to be sent to a modulator/demodulator 12. The modulator/demodulator 12 performs signal modulation on the notified information, and transmits the modulated signal to a transmitter/receiver 13.

The transmitter/receiver 13 performs analog-to-digital conversion on the received modulated signal, and up-converts the analog signal to a wireless frequency. The signal processed in the transmitter/receiver 13 is transmitted to the terminal from an antenna unit 14. The antenna unit 14 is controlled by the controller 11 so that a beam is directed to the direction of the terminal to which the information is to be sent.

When the controller 11 determines that data is to be received from a particular terminal, the antenna unit 14 is controlled by the controller 11 so that a beam is directed to the direction of the terminal from which data is to be sent. A signal received by the antenna unit 14 is transmitted to the transmitter/receiver 13.

The transmitter/receiver 13 down-converts the frequency of the received signal, performs analog-to-digital conversion on the down-converted signal, and transmits the digital signal to the modulator/demodulator 12. The modulator/demodulator 12 demodulates the signal, and sends the demodulated data to the controller 11.

The controller 11 puts the received data on the network. When the received data is a handover request from a terminal, the controller 11 analyzes measurement results received along with the data as results of measuring broadcast signals of nearby base stations.

When receiving a handover request, the base station uses the controller 11 to determine a nearby base station suitable as a handover destination and a beam direction based on the results of measuring broadcast signals, and makes a handover request to the determined nearby base station. The base station includes the ID of the terminal to be handed over and other types of information in the handover request, and notifies the handover request.

The base station receives a response from the nearby base station, uses the controller 11 to create a handover execution command, and instructs, via the modulator/demodulator 12, the transmitter/receiver 13, and the antenna unit 14, the terminal that has requested handover to execute handover. The handover execution command contains the ID of the handover destination base station, and timing information about the timing of transmitting a RACH signal.

Meanwhile, the nearby base station receives the handover request, and, based on information about a beam direction notified along with the handover request, waits for the reception of a RACH signal of the terminal to be handed over at RACH signal reception timing of a beam direction group in which the notified beam direction is included. The beam direction in this case is controlled by the operation described above with reference to FIG. 1, FIG. 3, and FIG. 4.

The controller 11 of the nearby base station that is now the handover destination controls the beam direction of the antenna unit 14 at the RACH signal reception timing. A RACH signal detector 15 executes RACH signal detection operation for a signal input via the transmitter/receiver 13. When a RACH signal is detected, the RACH signal detector 15 notifies the controller 11 of the detection of a RACH signal.

The controller 11 receives the notification about the detection of a RACH signal, generates a random access channel response signal, and returns the random access channel response signal to the terminal via the modulator/demodulator 12, the transmitter/receiver 13, and the antenna unit 14.

Figure 6:
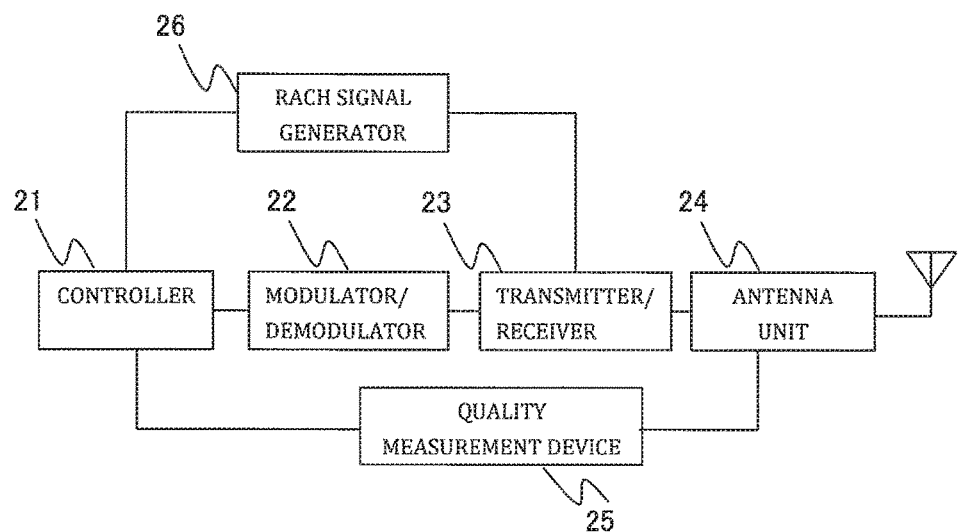
FIG. 6 is a diagram for illustrating the configuration of a terminal according to the first embodiment of the present invention.

FIG. 6 is a diagram for illustrating the configuration of a terminal according to the first embodiment of the present invention. During communication, a controller 21 detects data generated in the terminal, and uses wireless resources allocated by a base station to transmit the detected data to a modulator/demodulator 22 at transmission timing assigned by the base station. The modulator/demodulator 22 performs signal modulation on the received data, and transmits the modulated signal to a transmitter/receiver 23.

The transmitter/receiver 23 performs digital-to-analog conversion on the received modulated signal, and up-converts the analog signal to a wireless frequency. The signal processed in the transmitter/receiver 23 is transmitted from an antenna unit 24 to the base station.

To receive a signal, the terminal puts the controller 21, the modulator/demodulator 22, the transmitter/receiver 23, and the antenna unit 24 into operation so that a signal destined to the terminal can be received and demodulated any time. When it is confirmed that a message destined to the terminal is contained in a signal, the terminal processes the message as self-destined data.

A quality measurement device 25 at this point measures the level of reception power, or a signal-to-interference plus noise power ratio (SINR), of the signal carrying the data to the terminal or of a broadcast signal, and reports the result of the measurement to the controller 21.

The controller 21 receives the report, and determines that the quality is deteriorated when the measurement value is lower than a predetermined threshold value. The controller 21 instructs the quality measurement unit 25 to measure a broadcast signal of a nearby base station.

The quality measurement unit 25 receives the instruction to measure a broadcast signal of a nearby base station, and reports the result of the measurement to the controller 21. The controller 21 receives the measurement result of the nearby base station, includes the measurement result in a message requesting handover, and transmits the message to the current communication partner base station through the modulator/demodulator 22, the transmitter/receiver 23, and the antenna unit 24.

When a handover execution command is contained in the data to the terminal received from the base station, the terminal uses the notified information to transmit a RACH signal to the handover destination base station at RACH signal transmission timing. To that end, the controller 21 instructs a RACH signal generator 26 to generate a RACH signal.

The generated RACH signal is transmitted to the handover destination base station through the transmitter/receiver 23 and the antenna unit 24. After the RACH signal is transmitted, the controller 21 executes the operation of detecting a random access channel response in the demodulated data, which is received from the modulator/demodulator 22.

Figure 7:
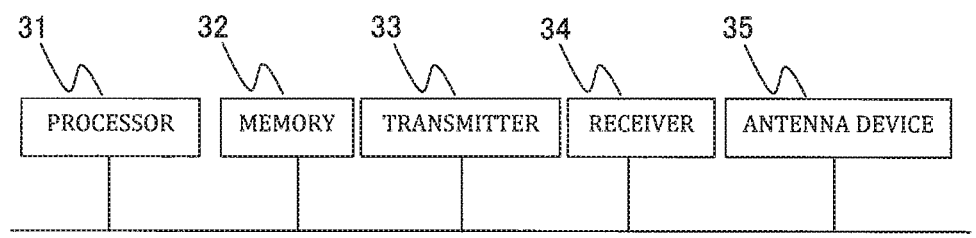
FIG. 7 is a diagram for illustrating an example of a hardware configuration by which the base station and the terminal according to the first embodiment of the present invention are implemented.

FIG. 7 is a diagram for illustrating an example of a hardware configuration by which the base station and the terminal according to the first embodiment of the present invention are implemented. The base station illustrated in FIG. 5 is implemented by, for example, a processor 31, a memory 32, a transmitter 33, a receiver 34, and an antenna device 35.

The processor 31 is a central processing unit (CPU: also called a processing device, an arithmetic device, a microprocessor, a microcomputer, a processor, or a DSP), a system large scale integration (LSI) chip, or the like.

The memory 32 is a non-volatile or volatile semiconductor memory, for example, a random access memory (RAM), a read-only memory (ROM), a flash memory, an erasable programmable read-only memory (EPROM), or an electrically erasable programmable read-only memory (EEPROM), a magnetic disk, a flexible disk, an optical disc, a compact disc, a mini disc, a digital versatile disc (DVD), or the like.

The controller 11, the modulator/demodulator 12, and the RACH signal detector 15 in the base station are implemented by the processor 31 and by a program stored in the memory 32. Specifically, the controller 11, the modulator/demodulator 12, and the RACH signal detector 15 are implemented by the processor 31 by reading out of the memory 32 a program that dictates the operation of the controller 11, the modulator/demodulator 12, and the RACH signal detector 15, and executing the program.

The transmitter/receiver 13 is implemented by the transmitter 33 and the receiver 34. Specifically, transmission processing in the transmitter/receiver 13 is executed by the transmitter 33, and reception processing in the transmitter/receiver 13 is executed by the receiver 34. The antenna unit 14 is implemented by the antenna device 35.

The controller 21, the modulator/demodulator 22, and the RACH signal generator 26 in the terminal, which are illustrated in FIG. 6, are implemented by the processor 31 and by a program stored in the memory 32. Specifically, the controller 21, the modulator/demodulator 22, and the RACH signal generator 26 are implemented by the processor 31 by reading out of the memory 32 a program that dictates the operation of the controller 21, the modulator/demodulator 22, and the RACH signal generator 26.

The transmitter/receiver 23 is implemented by the transmitter 33 and the receiver 34. Specifically, transmission processing in the transmitter/receiver 23 is executed by the transmitter 33, and reception processing in the transmitter/receiver 23 is executed by the receiver 34. The quality measurement unit 25 is also implemented by the receiver 34. The antenna unit 24 is implemented by the antenna device 35.

Figure 8:
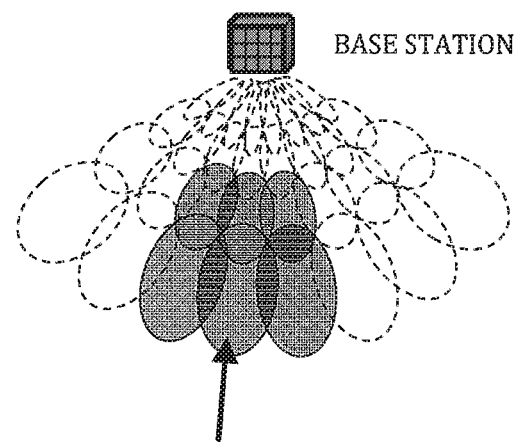
FIG. 8 is a diagram for illustrating another method according to the first embodiment of the present invention in which information about a beam direction determined as suitable is notified, along with a handover request, to a base station specified as a handover destination base station, and the specified base station uses the information to combine adjacent beams when a RACH signal is to be received.

FIG. 8 is a diagram for illustrating another method according to the first embodiment of the present invention in which information about a beam direction determined as suitable is notified, along with a handover request, to a base station specified as a handover destination base station, and the specified base station uses the information about a beam direction determined as suitable to combine adjacent beams when a RACH signal is to be received.

In FIG. 8, a beam direction identified as suitable from the measurement result of a terminal is indicated by the arrow. The premise of the method illustrated in FIG. 8 is that the base station knows, in advance, timing at which the terminal to be handed over transmits a RACH signal, and that no other terminals than the terminal to be handed over transmit a RACH signal to the base station.

In this method, adjacent beam directions that can be combined with the identified beam direction are not limited to beam directions running toward the edges of the service area of the base station, and the identified beam direction is combined also with beam directions closer to the base station than to the edges. In other words, beam directions surrounding the identified beam direction are combined in this method.

This raises the probability of successful detection of a RACH signal even when the terminal moves toward the direction of the base station in a period from the identification of a beam suitable for handover based on the measurement result of the terminal till the actual transmission of a RACH signal by the terminal, or when the suitable beam changes due to a change in wireless transmission environment, for example, shadowing or phasing.

Another method is also adoptable in which, when RACH signal detection is unsuccessful at the first timing of receiving a RACH signal, the same group of beam directions as the last time is used at the next timing of receiving a RACH signal. This method is effective when the base station knows, in advance, timing at which the terminal to be handed over transmits a RACH signal, and no other terminals than the terminal to be handed over transmit a RACH signal to the base station.

If there is a possibility that a RACH signal is transmitted to the base station from terminals other than the terminal to be handed over, the base station is required to prepare for the reception of RACH signals by directing a beam to different directions in the service area of the base station at different times until all directions in the service area are covered. This prevents the base station from focusing on the reception of a RACH signal from the terminal to be handed over.

The situation in which the base station knows, in advance, timing at which the terminal to be handed over transmits a RACH signal, and no other terminals than the terminal to be handed over transmit a RACH signal to the base station can occur when, for example, a dual connectivity configuration standardized by the standardization organization 3GPP is employed.

Figure 9:
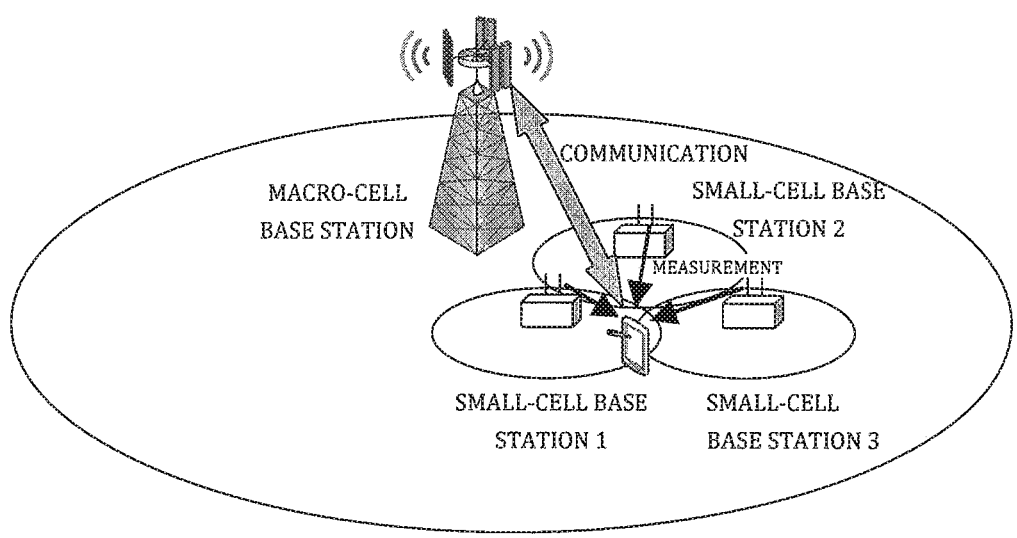
FIG. 9 is a diagram for illustrating a wireless communication system according to the first embodiment of the present invention in which a dual connectivity configuration is included.

FIG. 9 is a diagram for illustrating a wireless communication system according to the first embodiment of the present invention in which a dual connectivity configuration is included. In the example of FIG. 9, Small-cell Base Stations 1 to 3, which have small service areas, are located inside a macro-cell base station, which has a large service area.

The terminal connects to the macro-cell base station as a main station, and also connects to one of the small-cell base stations that is near as a second base station. To connect to one of the small-cell base stations, the terminal measures, in advance, signals from nearby small-cell base stations, and reports the result of the measurement to the macro-cell base station.

In response to the report, the macro-cell base station determines, from the reported measurement result, to which small-cell base station the terminal is to be connected, and notifies the determined small-cell base station and the terminal that connection is to be established between the two.

Determination by the macro-cell base station is involved also when a switch is made from one small-cell base station to another. Specifically, the macro-cell base station determines a switched-to small-cell base station, and instructs the terminal and the switched-to small-cell base station to establish connection between the two. The switched-to small-cell base station can accordingly find out timing at which the terminal transmits a RACH signal to the small-cell base station. This connection mode is free from a situation in which the terminal transmits a RACH signal on its own determination.

While the description given with reference to FIG. 9 takes the dual connectivity configuration as a specific example, a wireless communication system to which the present invention is applied is not limited to this configuration. The beam direction control described above is applicable also to a configuration in which transmission timing of a RACH signal of a terminal is managed by a separate control device, and information about the transmission timing is notified to a base station that is to receive the RACH signal. This method is not limited to a terminal to be handed over, and can be applied also to a terminal that is to establish initial connection.

The configurations illustrated in FIG. 5 and FIG. 6 are adequate for the base station that implements beam direction control and the terminal in the dual connectivity configuration described above. The terminal uses the controller 21 to determine whether to transmit a transmission signal to the macro-cell base station or one of the small-cell base stations.

If the frequency varies depending on the destination, the transmitter/receiver 23 discriminates between frequencies when generating a signal. When signals have a shared frequency and the ID of a destination base station is included in each signal, on the other hand, the controller 21 only sends a signal in which the base station ID is inserted to the modulator/demodulator 22.

In order to allow one of the small-cell base stations to form a beam direction group for the reception of a RACH signal, the controller 11 starts preparing for the reception of a RACH signal after an interface of another base station receives a notification about RACH signal reception timing. The controller 11 at this point determines which adjacent beam directions are to be grouped together based on predetermined grouping, and controls the antenna unit 14 so that a beam is directed to a particular direction.

When RACH signal detection is unsuccessful at the first timing of receiving a RACH signal, the controller 11 determines that the beam is to be directed to the same beam direction as the last time at the next timing of receiving a RACH signal, and controls the antenna unit 14 accordingly.

In another example of carrying out the present invention, a beam direction group for RACH signal reception is formed with the use of notified quality information of each adjacent beam direction when adjacent beam directions in addition to an identified beam direction are used to receive a RACH signal.

Figure 10:
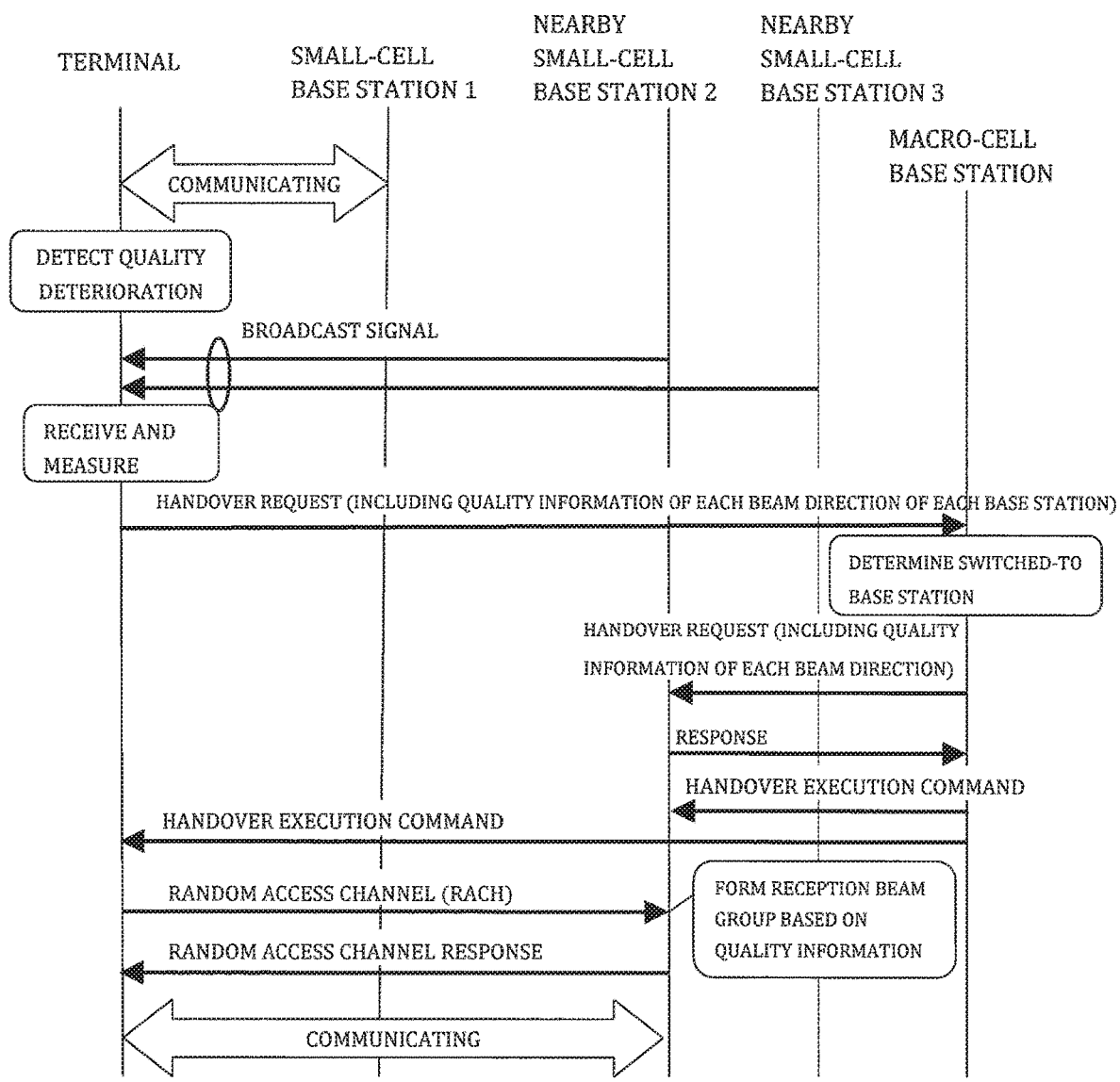
FIG. 10 is a diagram for illustrating a signal sequence of handover premised on the dual connectivity configuration of the wireless communication system according to the first embodiment of the present invention.

FIG. 10 is a diagram for illustrating a signal sequence of handover premised on the dual connectivity configuration of the wireless communication system according to the first embodiment of the present invention. When quality deterioration is detected in communication to and from Small-cell Base Station 1, the terminal receives broadcast signals from nearby Small-cell Base Station 2 and nearby Small-cell Base Station 3, and measures the quality of the broadcast signals. After finishing the quality measurement, the terminal transmits a handover request in which quality information of each beam is contained to the macro-cell base station.

The macro-cell base station determines, from the reported quality information, a small-cell base station suitable as a handover destination. In the example of FIG. 10, the macro-cell base station issues a handover request to Small-cell Base Station 2. When issuing the handover request, the macro-cell base station notifies quality information of each beam as well to Small-cell Base Station 2 determined as a suitable handover destination.

The macro-cell base station receives a response from Small-cell Base Station 2, and sends a handover execution command to the terminal. Along with the handover execution command, the macro-cell base station notifies the ID of the handover destination small-cell base station and timing at which a RACH signal is to be transmitted.

Small-cell Base Station 2, which is the handover destination, receives a handover execution command as well, and starts preparing for RACH signal reception. Small-cell Base Station 2 as the handover destination prepares by determining a beam direction for RACH signal reception with the use of the notified quality information of each beam. The quality information can be used to, for example, select the first to N-th highest quality beam directions. The number N can be one predetermined value.

The configurations illustrated in FIG. 5 and FIG. 6 are adequate for the base station and the terminal that execute communication steps of FIG. 10 described above. The controller 21 is only required to include quality information of each beam direction in the transmission signal when the terminal makes a handover request to the macro-cell base station.

When one of the small-cell base stations receives a handover execution command from the macro-cell base station, the control unit 11 of the small-cell base station is only required to form a beam direction group for RACH signal reception with the use of quality information of each beam direction, which is notified in advance.

An advantage of forming a beam direction group for RACH signal reception with the use of quality information of each beam direction in this manner is that the probability of successful detection of a RACH signal can be raised with a small number of beams.

The description given above in detail with reference to FIG. 9 and FIG. 10 is about the case of handover premised on the dual connectivity configuration. However, the same operation and device configuration can be used to establish connection for the first time between the terminal and one of the small-cell base stations as the second base station, as long as the system has the dual connectivity configuration.

It is apparent that, in general handover, the same operation can be accomplished also when the terminal reports the measurement result to the current communication partner base station, and the current communication partner base station or a separately prepared control unit determines a handover destination base station, without the dual connectivity configuration.

The number N is one predetermined value in the specific example described above. In another method, when RACH signal detection is unsuccessful at RACH signal reception timing, the number N is increased at the next RACH signal reception timing.

This method increases beam directions each time RACH signal reception is repeated, from N beam directions to N+1 beam directions, N+2 beam directions, and so on. Beam directions can be increased in various manners, for example, from N beam directions to N+2 beam directions, N+4 beam directions, and so on. When increasing beam directions, the base station uses the beam direction quality information to add beam directions in descending order of quality.

The method in which the number of beam directions to be used is increased each time RACH signal reception is repeated can be a countermeasure for a situation in which a failure to receive a RACH signal lasts long and, in the meantime, the terminal moves farther and out of an area covered by the reception beam.

An advantage of using beam direction quality information when the number of beam directions is increased is that the probability of successful detection of a RACH signal rises. This method can be carried out by the controller 11 having the base station configuration of FIG. 5.

In the description given above, when there are different beam direction groups each of which has its own RACH signal reception timing, the terminal transmits a RACH signal at the timing of one of the groups. For instance, RA 1 and RA 2 in FIG. 3 are for different beam direction groups, and the terminal transmits a RACH signal at one of the timing RA 1 and the timing RA 2 in the case described above.

However, there is no need to limit the present invention to the timing as this. For example, the terminal may operate so as to transmit a RACH signal at RA 1 and RA 2 both when Notification Signal 1 (Notification 1) and Notification Signal 2 (Notification 2) illustrated in FIG. 3 are received by the terminal, the first-highest quality beam is in Notification 1, and the second-highest quality beam is in Notification 2. The probability at which the base station successfully detects a RACH signal can be raised by this operation.

This operation is effective particularly when, for example, the terminal is located at the boundary between different beam direction groups as illustrated in FIG. 4. This operation is not limited to the case in which there are two groups, and is adoptable for the case in which three or more groups are formed, and a RACH signal may be transmitted to every one of the groups as long as a quality high enough to hold communication can be obtained for any group.

This operation of the terminal is accomplished by the terminal configuration illustrated in FIG. 6. When it is determined from the measurement result of the quality measurement device 25 that a RACH signal can be transmitted to a plurality of beam direction groups, the controller 21 instructs the RACH signal generator 26 to generate a RACH signal at timing of each of the plurality of beam direction groups.

Figure 11:
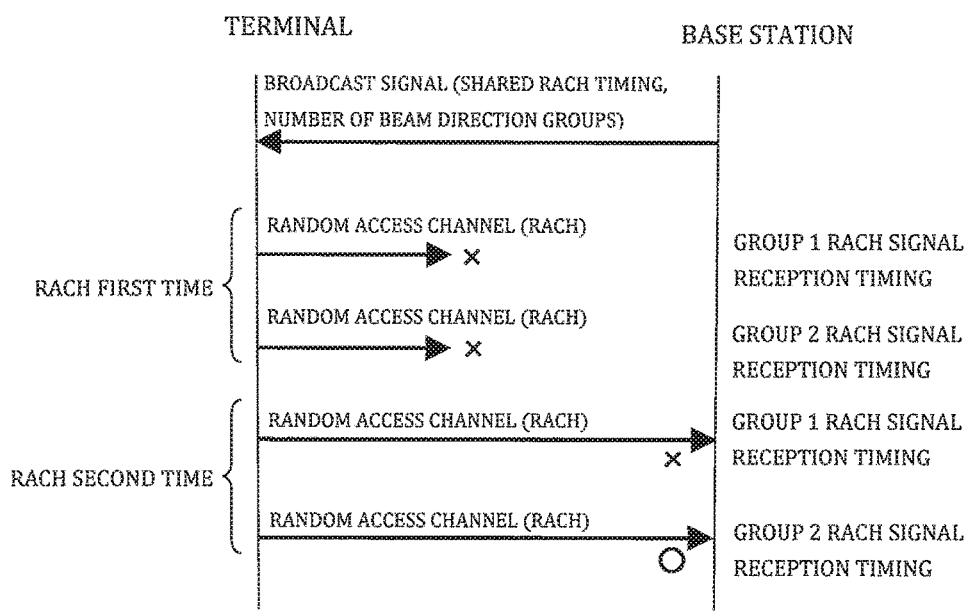
FIG. 11 is a diagram for illustrating the sequence of signals exchanged between a base station and a terminal when the base station notifies the number of beam direction groups in the first embodiment of the present invention.

FIG. 11 is a diagram for illustrating the sequence of signals exchanged between a base station and a terminal when the base station notifies the number of beam direction groups in the first embodiment of the present invention. In FIG. 11, the premise is that the base station notifies only shared RACH signal reception timing, irrespective of beam direction groups, and information about the number of beam direction groups is added to a broadcast signal.

The premise that the base station notifies shared RACH signal reception timing means the following:

While the beam direction is changed for the transmission of Notification Signal 1 (Notification 1) and the transmission of Notification Signal 2 (Notification 2) in FIG. 3, the base station does not notify the RACH signal reception timing RA 1 associated with Notification 1 and the RACH signal reception timing RA 2 associated with Notification 2.

The premise means that, under a condition in which the interval between RA 1 and RA 2 and the interval between RA 2 and RA 1 are the same, only the cycle of the timing (the interval between RA 1 and RA 2, or the interval between RA 2 and RA 1) and an offset from a reference are notified as shared RACH signal reception timing, irrespective of RA 1 and RA 2.

The terminal in this case has no way of finding out RACH signal transmission timing associated with a beam direction suitable for the communication of the terminal when it is determined that a beam direction group used for the transmission of Notification Signal 1 (Notification 1) includes the suitable beam direction. The terminal accordingly transmits a RACH signal at the timing RA 1 and the timing RA 2 in FIG. 3 both. This causes a problem particularly when the terminal is completely unsuccessful in receiving Notification Signal 2 (Notification 2).

In an LTE communication system already standardized by 3GPP and starting running a service, the terminal manages the number of times a RACH signal is re-transmitted, and, when the re-transmission count reaches a predetermined count, stops re-transmitting a RACH signal. The terminal also increases the transmission power little by little each time a RACH signal is re-transmitted. When the terminal has no way of finding out the number of beam direction groups as described above, it is therefore difficult to control the RACH signal re-transmission count or to control the increase in transmission power.

The present invention addresses this by notifying the number of beam direction groups from the base station. FIG. 11 is a specific example in which the number of beam direction groups is two. The terminal in this case increases the count by one on a transmission counter managed by the terminal each time the number of times RACH signal transmission is executed reaches two. When RACH signal transmission is executed twice more (corresponds to "RACH second time" in FIG. 11), the terminal regards the total transmission count as two. The terminal also increases transmission power once each time RACH signal transmission is executed twice.

By notifying the number of beam direction groups from the base station to the terminal in the manner described above, the RACH signal re-transmission count and the transmission power can be controlled efficiently and wastelessly on the terminal side. Those operations, too, can be accomplished with the base station configuration and terminal configuration illustrated in FIG. 5 and FIG. 6. The base station is only required to include the number of beam direction groups in a broadcast signal in the controller 11, and the terminal is only required to control the RACH signal re-transmission count and the transmission power in the controller 21.

In the description given above, the beam direction is directed to one beam direction group in one time slot as illustrated in FIG. 3. The present invention also allows a switch of beam directions in one time slot.

Figure 12:
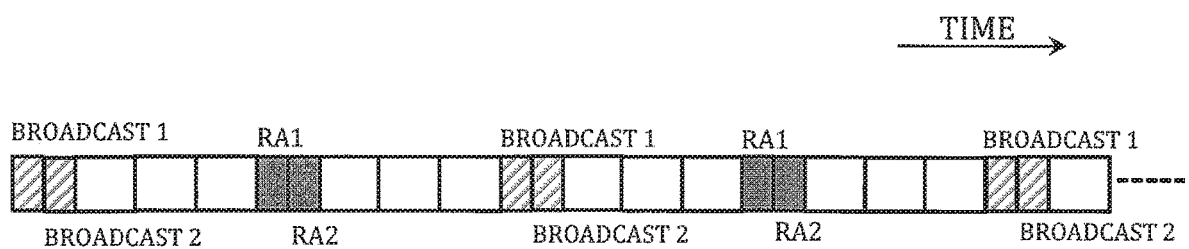
FIG. 12 is another diagram for illustrating an example of the relation between the timing of broadcast signal transmission by a base station and the timing of RACH signal reception at the base station in the wireless communication system according to the first embodiment of the present invention, which differs from the example of FIG. 3.
Figure 13:
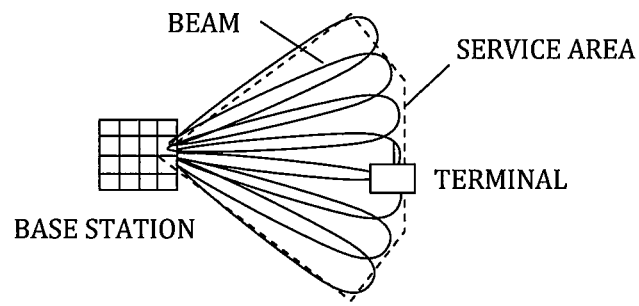
FIG. 13 is an explanatory diagram about a base station whose service area is established with the use of a plurality of beam directions.
Figure 14:
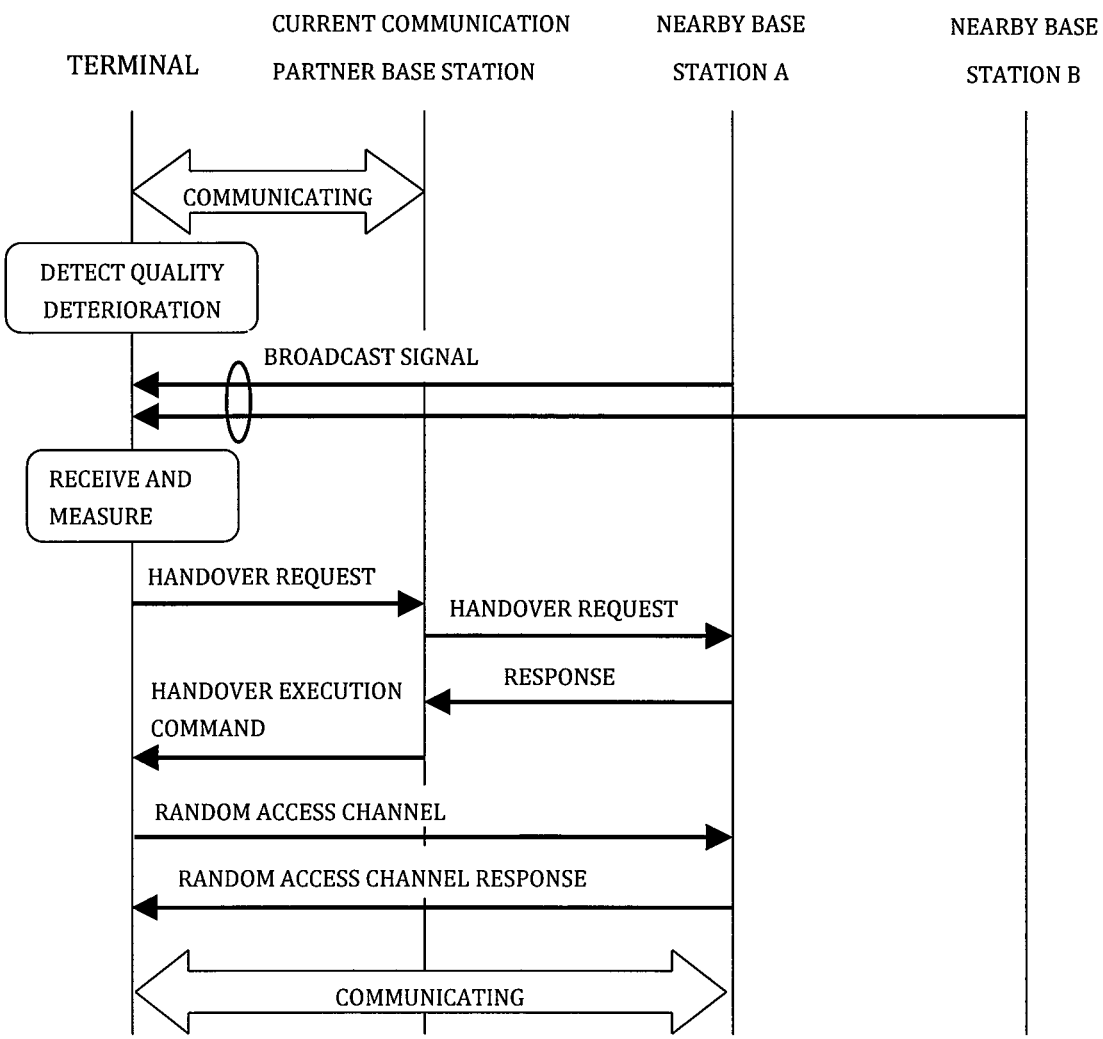
FIG. 14 is an explanatory diagram for illustrating a signal sequence of general handover in a wireless communication system in which beam forming is not used.

FIG. 12 is another diagram for illustrating an example of the relation between the timing of broadcast signal transmission by a base station and the timing of RACH signal reception at the base station in the wireless communication system according to the first embodiment of the present invention, which differs from the example of FIG. 3. Specifically, a switch is made between two beam direction groups in one time slot in the example illustrated FIG. 12.

The beam direction groups are switched in one time slot to transmit Notification Signal 1 and Notification Signal 2. In another time slot, a switch is made between the beam direction group of RACH Signal 1, which is associated with Notification Signal 1, and the beam direction group of RACH Signal 2, which is associated with Notification Signal 2.

In this manner, the time spent on the transmission of a broadcast signal and the reception of a RACH signal is reduced, and more time slots can be allocated to communication.

As described above, the present invention includes a configuration in which adjacent beam directions are combined as a combination of a plurality of beam directions when a RACH signal is to be received. A state leading to a failure to receive a signal from a moving terminal in handover can consequently be prevented.

The present invention also includes a configuration in which, when the entire service area of a base station of interest cannot be covered by combining a plurality of beam directions, and the timing is required to arrive twice or more, at least one of beam direction groups is a combination of adjacent beam directions selected out of beam directions running toward the edges of the service area. Handover of a terminal having moved from the service area of another base station can consequently be executed more securely.

A RACH signal reception base station of the present invention includes a configuration in which, when a beam direction suitable for RACH signal reception is notified, the notified beam direction is combined with beam directions surrounding the notified beam direction. The probability of successful detection of a RACH signal can consequently be raised even when the terminal moves toward the base station, or when the suitable beam changes due to a change in the wireless transmission environment, for example, shadowing or fading.

The base station according to the present invention, or a control station, which determines a beam direction for RACH signal transmission/reception, includes a configuration in which beam directions determined as suitable for RACH signal transmission/reception are prioritized, and information about this order of priority is notified to the RACH signal reception base station. Meanwhile, the RACH signal reception base station includes a configuration in which a plurality of beam directions are combined for RACH signal reception, based on the notified order of priority. The probability of successful detection of a RACH signal can consequently be raised with a small number of beams by forming a beam direction group for RACH signal reception with the use of quality information of each beam direction.

The RACH signal reception base station in the present invention also includes a configuration in which, when the RACH signal reception base station fails to receive a RACH signal, the number of a plurality of beam directions combined for the next RACH signal reception is increased from the number of beam directions combined for the failed RACH signal reception. This consequently prevents a situation in which the base station keeps failing to receive a RACH signal for a prolonged period, and the terminal moves farther during the prolonged period and leaves an area covered by the reception beam.

The present invention also includes a configuration in which the number of beam directions combined is increased based on quality information of each beam direction. The probability of successful detection of a RACH signal can consequently be raised even higher by preferentially selecting high quality beam directions with the use of the beam direction quality information when the number of beam directions is increased.

The terminal according to the present invention includes a configuration in which, when two or more beam directions that can be determined as suitable for handover destination beam directions are found as a result of receiving and measuring broadcast signals of nearby base stations, and the base stations' RACH signal reception timing associated with the suitable beam directions vary from one another, a RACH signal is transmitted at each different timing. The probability of successful detection of a RACH signal at the base station can consequently be raised.

The base station according to the present invention includes a configuration in which, when the entire service area of the base station cannot be covered by combining a plurality of beam directions, and the timing is required to arrive twice or more, the number of beam direction groups is included in a broadcast signal to be notified to the terminal. The RACH signal re-transmission count and the transmission power can consequently be controlled efficiently and wastelessly on the terminal side.

The present invention further includes a configuration in which beam directions are switched in one time slot. As a result, the time spent on the transmission of a broadcast signal and the reception of a RACH signal is reduced, and more time slots can be allocated to communication.

The invention claimed is:

1. A beam transmission/reception method, which is executed in a wireless communication system in which a terminal and a base station use a beam to communicate to and from each other, the beam transmission/reception method comprising:
grouping, by the base station, when the base station is to receive a random access channel signal transmitted as a connection request from the terminal, a plurality of beam directions by combining a main beam direction, which is determined as suitable for reception of the random access channel signal, with one or more beam directions adjacent to the main beam direction; and
receiving the random access channel signal with use of the grouped plurality of beam directions,
wherein, when one group formed by combining the plurality of beam directions into a group is insufficient to cover an entirety of a service area of the base station, and the service area is required to be divided into a plurality of groups, the grouping includes combining a plurality of beam directions adjacent to one another in directions of edges of the service area, as at least one of the plurality of groups, and
wherein, when the base station includes a current communication partner base station, which is holding communication to and from the terminal, and a nearby base station which is a handover destination, the method further comprises:
grouping, by the nearby base station, the plurality of beam directions;
executing, by the nearby base station, processing of receiving the random access channel signal with use of the plurality of grouped beam directions;
regrouping, by the nearby base station, beam directions when the nearby base station fails to receive the random access channel signal with use of the plurality of previously grouped beam directions, by increasing a number of beam directions from a number of previously grouped beam directions; and
re-executing, by the nearby base station, the processing of receiving the random access channel signal with use of the plurality of regrouped beam directions.

2. A beam transmission/reception method according to claim 1, wherein grouping the plurality of beam directions includes combining the main beam direction with beam directions surrounding the main beam direction.

3. A beam transmission/reception method according to claim 1, wherein, when the base station includes a current communication partner base station, which is holding communication to and from the terminal, and a nearby base station, which is a handover destination, the method further comprises:
generating, by the current communication partner base station, priority order information, which prioritizes a plurality of beam directions determined as having a suitable communication quality, when the random access channel signal transmitted from the terminal is to be received at the nearby base station, and of transmitting the priority order information to the nearby base station;
grouping, by the nearby base station, a plurality of beam directions by preferentially selecting beam directions high in the communication quality, based on the priority order information obtained from the current communication partner base station; and
executing, by the nearby base station, processing of receiving the random access channel signal with use of the plurality of previously grouped beam directions.

4. A beam transmission/reception method according to claim 3, further comprising:
regrouping, by the nearby base station, beam directions when the nearby base station fails to receive the random access channel signal with use of the plurality of previously preferentially grouped beam directions, by preferentially selecting beam directions high in the communication quality based on the priority order information so that a number of beam directions is further increased from a number of beam directions previously preferentially grouped; and re-executing, by the nearby base station, the processing of receiving the random access channel signal with use of the plurality of preferentially regrouped beam directions.

5. A beam transmission/reception method according to claim 1, wherein, when the base station includes a current communication partner base station, which is holding communication to and from the terminal, and a nearby base station, which is a handover destination, the method further comprises:

grouping, by the nearby base station, the plurality of beam directions, and transmitting, for each group of the plurality of beam directions, a broadcast signal containing information about timing at which reception of a random access channel signal is possible;

receiving, by the terminal, the broadcast signal from the nearby base station;

measuring, by the terminal, when the terminal receives a plurality of broadcast signals associated with different groups as the broadcast signal, a communication quality of each of the plurality of broadcast signals from a reception state of the each of the plurality of broadcast signals, and of identifying, for each of the plurality of broadcast signals, timing at which reception of a random access channel signal corresponding to the each of the plurality of broadcast signals is possible; and transmitting, by the terminal, when two or more broadcast signals determined as having a suitable communication quality are included among the plurality of broadcast signals, a random access channel signal for each of the two or more broadcast signals at timing indicated by the each of the two or more broadcast signals.

6. A beam transmission/reception method according to claim 1, wherein, when the base station includes a current communication partner base station, which is holding communication to and from the terminal, and a handover destination, the method further comprises:

grouping, by the nearby base station, the plurality of beam directions, and transmitting, for each group of the plurality of beam directions, a broadcast signal containing first information and second information, the first information being about shared timing at which reception of a random access channel signal is possible, the second information defining a number of beam direction groups;

receiving, by the terminal, the broadcast signal from the nearby base station;

identifying, by the terminal, timing at which reception of a random access channel signal is possible from the first information contained in the broadcast signal, and of identifying, as a transmission count of the random access channel signal, a count matching the number of beam direction groups in the second information, the transmission count being a number of times the random access channel signal is transmitted; and transmitting, by the terminal, the random access channel signal as many times as the identified transmission count at the identified timing.

7. A base station, which is to be applied to a wireless communication system in which a beam is used for communication to and from a terminal, the base station comprising:

a controller to control, when a random access channel signal transmitted as a connection request from the terminal is to be received, a beam direction of an antenna unit by combining a main beam direction, which is determined as suitable for reception of the random access channel signal, with one or more beam directions adjacent to the main beam direction, and thus grouping a plurality of beam directions;

a transmitter/receiver to receive, via the antenna unit, the random access channel signal transmitted from the terminal; and a detector to detect whether the random access channel signal has been received by the transmitter/receiver, wherein the controller groups beam directions, when one group formed by combining the plurality of beam directions into a group is insufficient to cover entirety of a service area of the base station, and the service area is required to be divided into a plurality of groups, by combining a plurality of beam directions adjacent to one another in directions of edges of the service area, as at least one of the plurality of groups, wherein the base station is one of a current communication partner base station, which is holding communication to and from the terminal, and a nearby base station, which is a handover destination, and wherein the nearby base station:

groups the plurality of beam directions and execute first-time reception processing of receiving the random access channel signal; and regroups beam directions, when the nearby base station fails to receive the random access channel signal in the first-time reception processing, by increasing a number of beam directions from a number of already grouped beam directions, and re-execute reception processing of receiving the random access channel signal as second-time reception processing.

8. A base station according to claim 7, wherein the controller groups the plurality of beam directions by combining the main beam direction with beam directions surrounding the main beam direction.

9. A base station according to claim 7, wherein the base station is one of a current communication partner base station, which is holding communication to and from the terminal, and a nearby base station, which is a handover destination, wherein the current communication partner base station generates priority order information, which prioritizes a plurality of beam directions determined as having a suitable communication quality, when the random access channel signal transmitted from the terminal is to be received, and transmits the priority order information to the nearby base station, and wherein the nearby base station:

groups a plurality of beam directions by preferentially selecting beam directions high in the communication quality, based on the priority order information obtained from the current communication partner base station; and executes first-time reception processing of receiving the random access channel signal with use of the grouped plurality of beam directions.

10. A base station according to claim 9, wherein the nearby base station regroups beam directions, when the nearby base station fails to receive the random access channel signal in the first-time reception processing, by preferentially selecting beam directions high in the communication quality based on the priority order information, and by increasing a number of beam directions from a number of already grouped beam directions, and re-executes reception processing of receiving the random access channel signal as second-time reception processing.

11. A wireless communication system, comprising:
a base station, which is to be applied to a wireless communication system in which a beam is used for communication to and from a terminal, the base station comprising:
a controller to control, when a random access channel signal transmitted as a connection request from the terminal is to be received, a beam direction of an antenna unit by combining a main beam direction, which is determined as suitable for reception of the random access channel signal, with one or more beam directions adjacent to the main beam direction, and thus grouping a plurality of beam directions;
a transmitter/receiver to receive, via the antenna unit, the random access channel signal transmitted from the terminal; and
a detector to detect whether the random access channel signal has been received by the transmitter/receiver; and
a terminal comprising
a transmitter/receiver that receives, from the nearby base station, a broadcast signal containing information about timing at which reception of a random access channel signal is possible in a grouped plurality of beam directions;
a quality measurement device that measures, when the transmitter/receiver receives as the broadcast signal a plurality of broadcast signals associated with different groups, for each of the plurality of broadcast signals, a communication quality of the each of the plurality of broadcast signals from a reception state of the each of the plurality of broadcast signals, and identifies, for each of the plurality of broadcast signals, timing at which reception of a random access channel signal corresponding to the each of the plurality of broadcast signals is possible; and
a controller that controls, when two or more broadcast signals determined as having a suitable communication quality are included among the plurality of broadcast signals, transmission of a random access channel signal for each of the two or more broadcast signals so that the random access channel signal is transmitted at timing indicated by the each of the two or more broadcast signals,
wherein, when the base station includes a current communication partner base station, which is holding communication to and from the terminal, and a nearby base station, which is a handover destination, the controller of the nearby base station groups the plurality of beam directions, generates, for each group of the plurality of beam directions, a broadcast signal containing first information and second information, and transmits the broadcast signal via the transmitter/receiver of the nearby base station, the first information being about shared timing at which reception of a random access channel signal is possible, the second information defining a number of beam direction groups, and
wherein, when the broadcast signal is received from the nearby base station, the controller of the terminal identifies timing at which reception of a random access channel signal is possible from the first information contained in the broadcast signal, identifies, as a transmission count of the random access channel signal, a count matching the number of beam direction groups in the second information, the transmission count being a number of times the random access channel signal is transmitted, and transmits the random access channel signal as many times as the identified transmission count at the identified timing.

* * * * *